(12) United States Patent
Koester et al.

(10) Patent No.: US 6,611,403 B1
(45) Date of Patent: Aug. 26, 2003

(54) MAGNET SPACER LOCATION FACILITATING IN-DECK MERGE

(75) Inventors: David Douglas Koester, Chanhassen, MN (US); Michael David Schroeder, Webster, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 19 days.

(21) Appl. No.: 09/697,103

(22) Filed: Oct. 26, 2000

Related U.S. Application Data
(60) Provisional application No. 60/193,687, filed on Mar. 31, 2000.

(51) Int. Cl.$^7$ ................................................. G11B 5/55
(52) U.S. Cl. .................................................. 360/264.7
(58) Field of Search ...................... 360/264.7; 310/12, 310/15, 36; G11B 5/55

(56) References Cited

U.S. PATENT DOCUMENTS

| | | | |
|---|---|---|---|
| 4,835,643 A | 5/1989 | Schulze | |
| 5,260,618 A | * 11/1993 | Dunfield et al. | 310/154 |
| 5,270,887 A | 12/1993 | Edwards et al. | |
| 5,305,169 A | * 4/1994 | Anderson et al. | 360/264.9 |
| 5,381,290 A | * 1/1995 | Cheng | 360/105 |
| 5,469,316 A | 11/1995 | Koriyama | |
| 5,483,400 A | 1/1996 | Tsujino | |
| 5,541,792 A | * 7/1996 | Kinoshita et al. | 360/246.8 |
| 5,576,583 A | * 11/1996 | Umehara | 360/264.7 |
| 5,581,422 A | * 12/1996 | Umehara | 360/264.7 |
| 5,654,848 A | 8/1997 | Maiers et al. | |
| 5,675,455 A | * 10/1997 | Matsumoto | 360/256.2 |
| 5,907,453 A | * 5/1999 | Wood et al. | 360/264.8 |
| 5,914,836 A | 6/1999 | Pottebaum | |
| 6,304,421 B1 | * 10/2001 | Brown | 360/264.8 |

* cited by examiner

Primary Examiner—William Korzuch
Assistant Examiner—Christopher R Beacham
(74) Attorney, Agent, or Firm—Derek J. Berger

(57) ABSTRACT

Disclosed is a disc drive voice coil magnet and spacer arrangement. Voice coil magnets and/or pole pieces are spaced from one another by spacers. On of the spacers is located beyond the coil end of the actuator. This allows the actuator to be lowered into the drive deck in an off-disc position without colliding with the spacer, thereby facilitating in-deck merging of the actuator.

9 Claims, 4 Drawing Sheets

MAGNET SPACER LOCATION FACILITATING IN-DECK MERGE

CROSS REFERENCE TO RELATED APPLICATIONS

This application claims the benefit of U.S. Provisional Application No. 60/193,687, filed Mar. 31, 2000.

FIELD OF THE INVENTION

This invention relates generally to the field of hard disc drive data storage devices, and more particularly, but not by way of limitation, to a voice coil magnet spacer positioned so as to facilitate in-deck merging of the actuator.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by flexures attached to the actuator.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. These magnets are typically mounted to plates, or "pole pieces" which are held in positions vertically spaced from another by spacers at each of their ends.

On the side of the actuator bearing housing opposite to the coil, the actuator assembly typically includes a plurality of vertically aligned, radially extending actuator head mounting arms, to which the head suspensions mentioned above are mounted. These actuator arms extend between the discs, where they support the head assemblies at their desired positions adjacent the disc surfaces. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved generally radially across the data tracks of the discs along an arcuate path.

The discs, actuator and voice coil magnets are mounted inside a housing, also known as a deck, along with all the other necessary components. Installation of the discs, magnets and actuator can be problematic, especially when the deck is of a tub-type casting having a floor and upstanding walls. When the actuator is fully installed, the arms and head must be positioned between the discs while the coil should be positioned between the magnets. It should be apparent that the actuator pivot and magnet spacers prevent the actuator from being moved laterally into its installed position, while preinstalled discs and magnets would also obstruct the actuator if it were lowered into its installed position. It has therefore been necessary for drive manufacturers to implement procedures for "merging" the magnets, discs and actuator as they are placed into the deck.

One way in which this has been accomplished in the past is by using machinery to properly position the magnets, discs and actuator relative to one another, and then lowering the resulting subassembly into the deck. However, this operation requires the use of specialized assembly equipment which is costly to create, maintain and operate.

Another way in which this problem has been solved in the past is by first installing the discs and the lower magnet plate in the deck before mounting the actuator on its pivot, with the actuator rotated into an off-disc position such that the discs do not interfere with its downward movement. The actuator can then be rotated into its installed position, and all that remains is to install the upper magnet above the coil. However, this final step gives rise to additional problems, because of the difficulties involve with installing the spacers between the magnets. On one hand, if the spacers are mounted to the lower magnet before it is mounted in the deck, the locations of the spacers will obstruct the actuator if an attempt is made to lower it into its off-disc position. On the other hand, it is very difficult as a mechanical matter to mount the spacers to a lower magnet which has already been installed in the deck. Manufacturers have reacted to this further problem by eliminating the spacers altogether. This is done, for example, by providing an upper pole piece which is bent downwardly and then outwardly at its ends, so the ends of the upper pole piece may be mounted directly to the ends of the lower pole piece. However, this requires that the upper and lower pole pieces be of different shapes, raising additional problems. For example, fabrication of upper and lower pole pieces of different shapes requires additional tooling, which in turn increases costs. Moreover, the bends in the upper plate can alter the magnetic field between the magnets. This causes the directions and magnitude of the magnetic field to be unpredictable, possibly resulting in a decrease in drive performance.

What the prior art has been lacking is a drive structure which allows its components to be easily assembled without requiring the use of excessive assembly machinery and without diminishing drive performance.

SUMMARY OF THE INVENTION

Disclosed is a voice coil magnet and spacer arrangement. Upper and lower magnets and/or pole pieces are arranged so as to allow a spacer to be located beyond the coil end of the actuator, thereby facilitating in-deck merging of the actuator with the discs and magnets. Additional features and benefits will become apparent upon a review of the attached figures and the accompanying description.

DETAILED DESCRIPTION OF THE INVENTION

Figure 1:
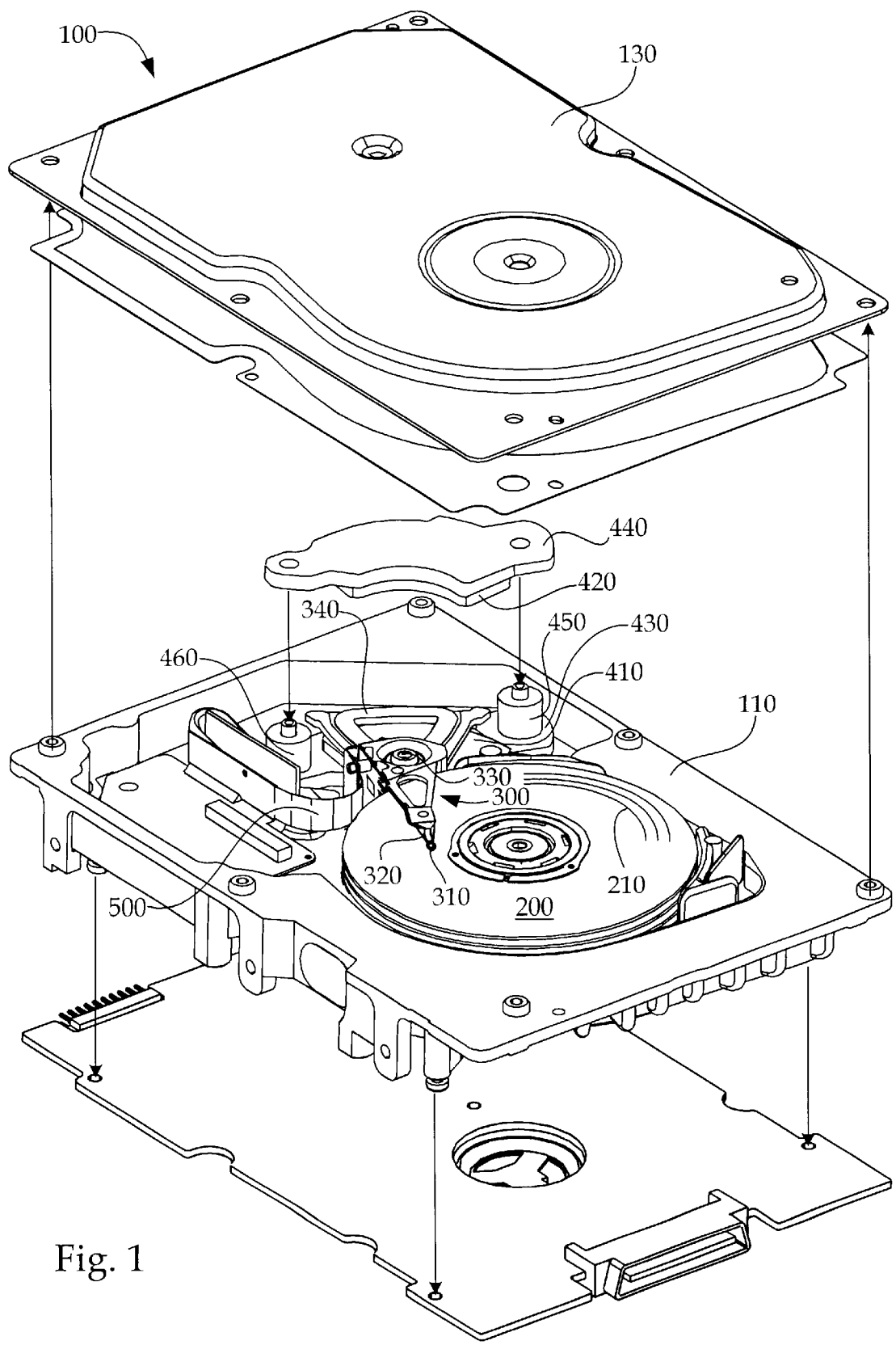
FIG. 1 shows an exploded view of a disc drive incorporating the magnet and spacer assembly of the present invention.
Figure 2:
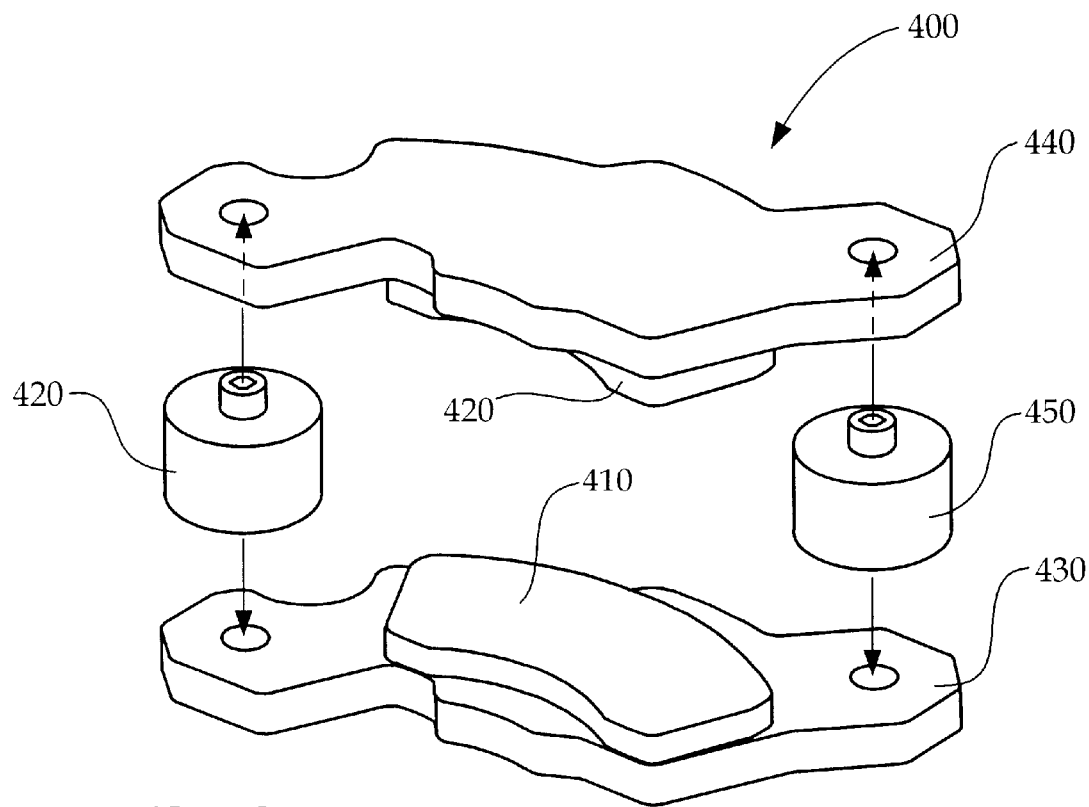
FIG. 2 shows an exploded view of a magnet assembly according to the present invention.

Turning now to the drawings and specifically to FIG. 1, shown is an exploded view of an example of a disc drive 100 in which the present invention is particularly useful. The disc drive 100 includes a deck 110 to which all other components are directly or indirectly mounted and a top cover 130 which, together with the deck 110, forms a disc drive housing which encloses delicate internal components and isolates these components from external contaminants. The deck 110 in this example is shown to be a tub-type casting having a floor and upstanding walls.

The disc drive 100 includes a plurality of discs 200 which are mounted for rotation on a spindle motor (not shown). The discs 200 include on their surfaces a plurality of circular, concentric data tracks 210 on which data are recorded via an array of vertically aligned head assemblies (one of which is shown at 310). The head assemblies 310 are supported by flexures 320, which are attached to arm portions of actuator 300. The actuator 300 is mounted for rotation about a pivot shaft 330.

Power to drive the actuator 300 about the pivot shaft 330 is provided by a voice coil motor (VCM). The VCM consists of a coil 340 which is supported by the actuator 300 within the magnetic field of a permanent magnet assembly 400 having a lower magnet 410 and an upper magnet 420. The lower magnet 410 is mounted to a lower pole piece 430 which is fixed to the deck 110, and the upper magnet 420 is supported above the lower magnet 410 by an upper pole piece 440. The upper pole piece 440 is supported above lower pole piece 430 by spacers 450, 460. Electronic circuitry to control all aspects of the operation of the disc drive 100 is provided, with control signals to drive the VCM, as well as data signals to and from the heads 310, carried between the electronic circuitry and the moving actuator 300 via a flexible printed circuit cable (PCC) 500.

Figure 4:
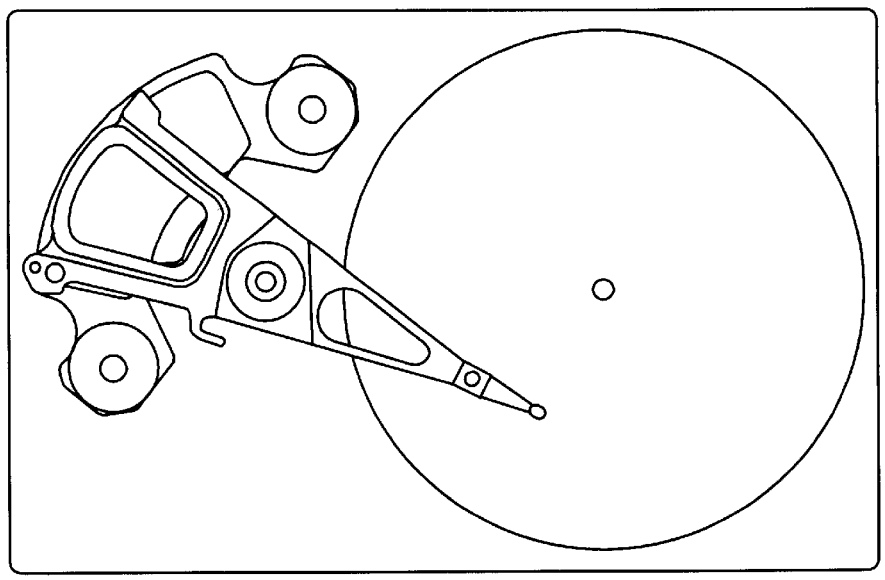
FIG. 4 depicts a prior art disc drive with conventionally positioned magnet spacers.

Until recently, discs 200 have been made in sizes which maximize the use of space within the deck 110. FIG. 4, for example, illustrates a simplified view of a prior art disc drive in which discs 200 extend almost the entire width of the deck 110. This was done in order to maximize the storage capacity of the drive 100, since for a given track spacing, increasing disc surface area will provide higher storage capacity. Recently, however, advances in drive technology have led to ever smaller track spacings, with the result that discs 200 are now able to store a great deal more information than ever before. As a result, drives can now be built with smaller discs 200 without suffering a decrease in storage capacity. One advantage gained from the use of smaller discs 200 is that the size of the actuator 300 scales down in proportion to the disc size decrease. Reducing the size of the actuator 300 also reduces its inertia, allowing it to accelerate faster, which in turn leads to faster data access. Reduction in disc size also permits higher spindle motor speeds. The sizes of the voice coil magnets 410, 420 and pole pieces 430, 440 also scale down in proportion to the decrease in disc and actuator size.

Figure 5:
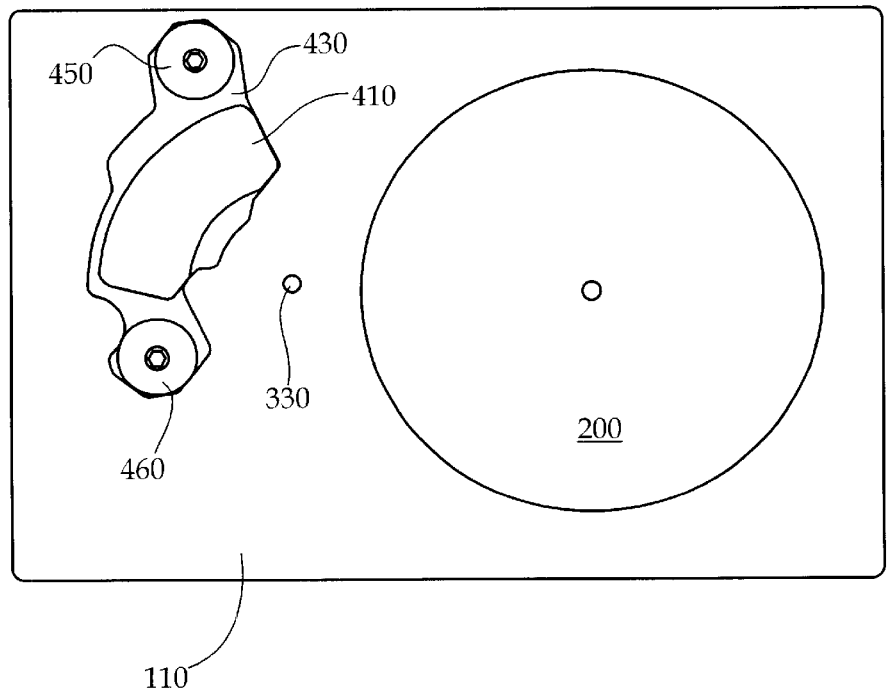
FIG. 5 depicts a disc drive incorporating the present invention prior to merging of the actuator.

The size of the drive deck 110, however, has not necessarily decreased in kind, since computer housings are still built with drive bays which have not changed in size. FIG. 5, for example, shows a drive 100 where the discs 200 are smaller in diameter than the discs in the prior art drive of FIG. 4 and do not extend the full width of the deck 110. Of particular relevance to the present: invention is the increase in the amount of unused space in the deck resulting from the reduction in size of the discs 200, actuator 300 and magnets 410, 420. One way in which this extra space may be taken advantage of in accordance with the present invention is explained below.

Figure 3:
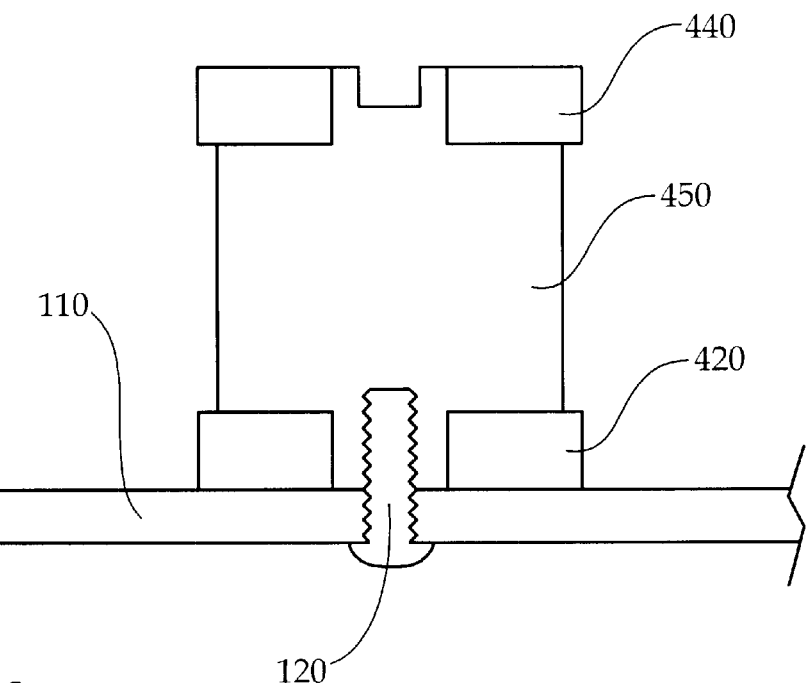
FIG. 3 shows a: cross sectional view of the magnet assembly as mounted to a drive deck.

FIG. 3 shows an example of a voice coil magnet assembly 400 made up of pole pieces 430, 440, magnets 410, 420 with spacers 450, 460 arranged in accordance with the present invention. Magnets 410, 420 are securely fixed to their corresponding pole pieces 430, 440 by any conventional means. Spacers 450, 460 include protrusions extending out of their upper and lower ends. Lower pole piece 430 has apertures into which the lower spacer extensions are inserted, and upper pole piece 440 has apertures into which the upper spacer protrusions are inserted. The spacers 450, 460 also have lower internally threaded bores, the function of which will be explained below. No mechanical fasteners are required to hold the assembly 400 together, as the magnetic force between magnets 410, 420 adequately serves this purpose. The spacers 450, 460 serve to precisely space the pole pieces 430, 440 relative to one another, while the precision fit between the spacer protrusions and pole piece apertures keeps the pole pieces 430, 440 aligned with one another. These components are preferably assembled before being placed in the deck 110. This is advantageous in that the magnetic field produced by the assembly 400 may be easily tested prior to its installation in the deck 110. The assembly 400 is also easily tested for defects prior to installation. This ability to inspect the assembly 400 prior to installation in the deck 110 makes its performance more predictable. The assembly 400 is also easily shipped and moved through the assembly process as a complete unit prior to installation.

FIG. 4 shows a cross-sectional view of the assembly 400 after it is has been placed in the deck 110, before the actuator 300 has been installed. Only spacer 450 is illustrated, however, it should be understood that a cross section at spacer 460 would appear substantially identical. Elongate threaded elements 120 extend upwardly from the floor of the deck 110. The entire assembly 400 is lowered into the deck 110 as a unit, and the assembly 400 is secured to the deck 110 by engagemeent between threaded elements 120 and the threaded bores of the spacers 450, 460.

FIG. 5 shows a cross-sectional view of the assembly 400 after it is has been placed in the deck 110, before the actuator 300 has been installed. Only spacer 450 is illustrated, however, it should be understood that a cross section at spacer 460 would appear substantially identical. Elongate threaded elements 120 extend upwardly from the floor of the deck 110. The entire assembly 400 is lowered into the deck 110 as a unit, and the assembly 400 is secured to the deck 110 by engagement between threaded elements 120 and the threaded bores of the spacers 450, 460.

Figure 6:
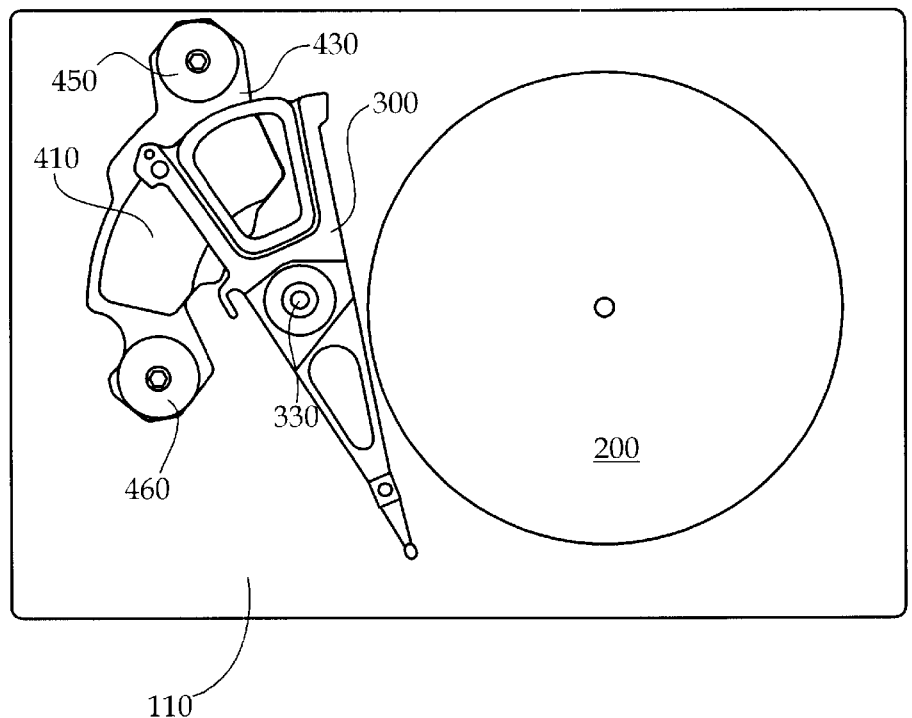
FIG. 6 depicts a disc drive incorporating the present invention after the actuator has been lowered into the deck.

The advantage provided by the location of spacer 450 is illustrated in FIG. 6, which shows a simplified view of the disc drive 100 of the present invention after the actuator 300 has been lowered into the deck 110. It can be clearly seen here that the actuator 300 has been dropped directly downward onto its pivot 330 in an off-disc orientation. It should also be clear that in this position the downward motion of the actuator during installation is unobstructed by either the discs 200 or the spacer 450. This is because spacer 450 is positioned beyond the path of travel of the coil 340 of actuator 300.

Figure 7:
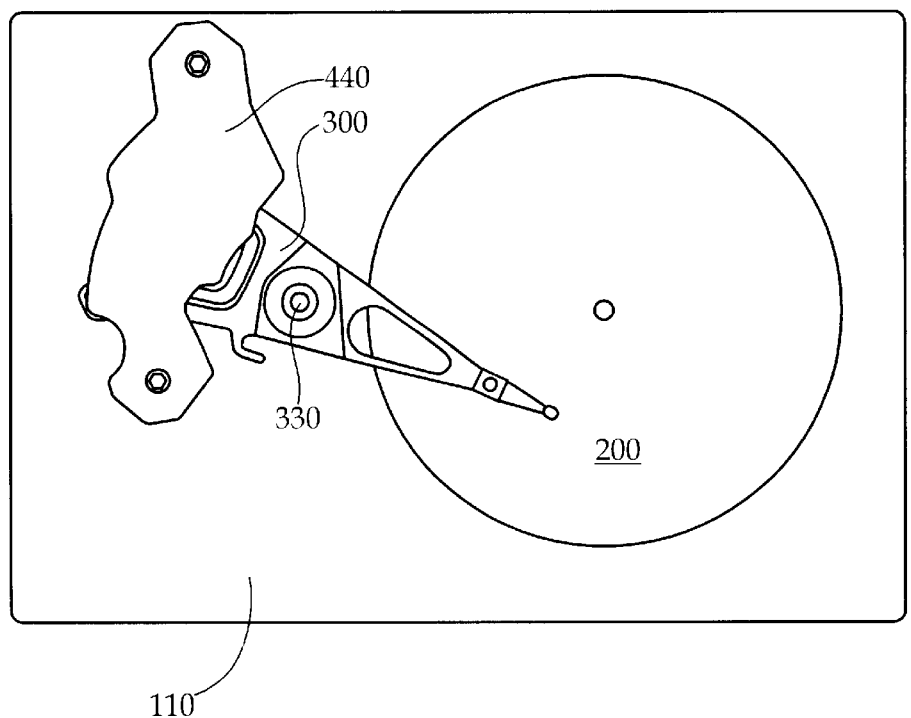
FIG. 7 depicts a disc drive incorporating the present invention after the actuator and upper pole piece have been fully installed.

FIG. 7 shows a simplified view of the drive 100 after the actuator 300 has been fully installed. Actuator 300 has been rotated from the off-disc position shown in FIG. 4 into its installed position and the upper pole piece 440 with upper voice coil magnet 420 affixed thereto has been reinstalled on top of spacers 450, 460.

The voice coil magnet spacer arrangement of the present invention provides several advantages over prior art spacer arrangements. First and foremost, it allows the merging of the actuator 300 with the magnets 410, 420 and discs 200 to be performed within the deck 110 as described above. This greatly simplifies the merge step relative to previous merging procedures in which merging of the discs, magnets and actuator was performed prior to placement of these elements into the deck. In-deck merging facilitates the use of less complex assembly equipment, resulting in cost savings as well as reduced assembly times.

The spacer arrangement of the present invention also represents an improvement over prior art in-deck merge operations. Unlike prior art arrangements, which typically made use of an upper pole piece of a bent shape mounted at its ends directly to the lower pole piece, the location of spacer 450 outside the travel of actuator coil 340 as described above permits the spacers 450, 460 to be fixed to lower pole piece 430 prior to installation of lower pole piece 430 into the deck 110. The inclusion of spacers 450, 460 facilitates the use of upper and lower pole pieces 440, 430 which have identical shapes. Identical upper and lower pole pieces 440, 430 can be manufactured from one set of tooling, thereby reducing manufacturing costs relative to those required for arrangements in which upper and lower pole pieces are of different shapes. The magnetic field generated by magnets 410, 420 on identical upper and lower pole pieces 440, 430 is also more uniform and more predictable that one generated by magnets on upper and lower pole pieces of different shapes.

Of course, it should be understood that a magnet assembly arrangement may differ from the example described above without departing from the spirit of the claimed invention.

Alternately characterized, a first contemplated embodiment of the invention includes a disc drive 100 having at least one disc 200, a magnet 410, a first pole piece 440 spaced from the magnet 410 and an actuator 300 adapted to pivot about a vertical axis 330. The actuator 330 is movable between a first position in which no portion of the actuator 300 overlies the disc 200, as illustrated in FIG. 6, and a second position in which a portion of the actuator overlies the at least one disc, as illustrated in FIG. 7. The actuator 300 also carries a coil 340 which is configured to be positioned between the magnet 410 and the first pole piece 440 when the actuator 300 is in the second position. At least a first spacer 450 is configured to support the first pole piece 440 relative to the magnet 410, and is positioned such that a portion of the coil 340 lies between the first spacer 450 and the vertical axis 330 when the actuator 300 is in the first position but not in the second position. Optionally, a second spacer 460 may be provided which is configured to support the first pole piece 440 relative to the magnet 410. A second pole piece 430 may optionally be provided to which the first magnet 410 may be affixed. A second magnet 420 may also optionally be affixed to the first pole piece 430.

Alternately characterized, a second contemplated embodiment of the invention includes a voice coil magnet assembly 400 adapted to be installed in a disc drive housing, having a first pole piece 430, a second pole piece 440, and a first magnet 410 affixed to the first pole piece 430, the first magnet 410 having a generally arcuate shape and a width defining an inner and outer radius. First and second spacer members 450, 460 serve as the sole source of support for the second pole piece 440 relative to the first pole piece 430, and the first spacer member 450 is positioned radially beyond the outer radius of the first magnet 410. Optionally, the first spacer member 450 may be located near one of two ends of the first magnet 410. The first and second pole pieces 430, 440 may optionally be substantially identical in shape. A second magnet 420 may also optionally be affixed to the second pole piece 440. The first spacer 450 may optionally be substantially cylindrical in shape.

From the foregoing, it is apparent that the present invention is particularly suited to provide the benefits described above. While particular embodiments of the invention have been described herein, modifications to the embodiments which fall within the envisioned scope of the invention may suggest themselves to one of skill in the art who reads this disclosure.

We claim:

1. A disc drive, comprising:

at least one disc;

a first magnet;

at least a first pole piece spaced from the first magnet;

an actuator adapted to pivot about a vertical axis, the actuator being movable between a first position in which no portion of the actuator overlies the at least one disc and a second position in which a portion of the actuator overlies the at least one disc;

a coil carried by the actuator and adapted to be positioned between the magnet and the first pole piece when the actuator is in the second position, the coil including a distal point further from the axis than any other point on the coil; and at least a first spacer configured to support the pole piece relative to the first magnet, the first spacer being positioned such that the distal point of the coil lies between the first spacer and the vertical axis when the actuator is in the first position but not when the actuator is in the second position.

2. The disc drive as claimed in claim 1, further comprising:

a second spacer configured to support the first pole piece relative to the first magnet.

3. The disc drive as claimed in claim 1, further comprising:

a second pole piece, the first magnet being affixed to the second pole piece.

4. The disc drive as claimed in claim 1, further comprising:

a second magnet affixed to the first pole piece.

5. The assembly as claimed in claim 3, wherein the first pole piece and the second pole piece are substantially identical in shape.

6. The assembly as claimed in claim 3, and further comprising: a second magnet affixed to the first pole piece.

7. The assembly as claimed in claim 1, wherein the first spacer is substantially cylindrical in shape.

8. A disc drive, comprising:

a base;

at least one disc rotatably mounted to the base;

an actuator mounted to the base and rotatable about a pivot axis;

a coil mounted to the actuator; and a voice coil magnet assembly comprising:
 a first pole piece;
 a first magnet; and
 means for spacing the magnet from the pole piece and for facilitating merging the actuator into the disc drive, the spacing means comprising an element intersecting a plane defined by the coil, the element further lying entirely outside an arc defined by the motion of a portion of the coil which is further from the pivot than all other portions of the coil.

9. The disc drive of claim 8, in which the spacing means comprises:

a cylindrical element mounted to the first pole piece.

* * * * *